INVENTOR.
WILLIAM H. TAYLOR
BY
Wheeler, Wheeler & Wheeler
ATTORNEYS

Patented May 5, 1953

2,637,359

UNITED STATES PATENT OFFICE 2,637,359

MEAT CHOPPING METHOD AND APPARATUS UTILIZING A CENTRIFUGALLY POSITIONED KNIFE WITHIN A ROTATING AND FORAMINOUS BASKET

William H. Taylor, Homestead, Fla., assignor of one-half to Alvin W. Hughes, Milwaukee, Wis.

Application June 14, 1948, Serial No. 32,818

10 Claims. (Cl. 146—93)

This invention relates to meat chopping methods and apparatus utilizing a centrifugally positioned knife within a rotating and foraminous basket.

It is a primary object of the invention to provide for the shearing cut of meat or the like into small pieces in a manner which is safe from the standpoint of the operator, and is exceptionally effective in relation to the amount of power required, and is economical in that it retains the meat juices without expressing them materially from the meat, and which involves no danger of injury to the apparatus from the accidental inclusion of bones, and which is extremely efficient in the handling of tremendous quantities of meat with small inexpensive apparatus and low power.

It is a further object of the invention to provide an apparatus which will shear particles of meat or the like from a mass with a minimum of cell disruption and a minimum conversion of power in the heating of the meat or other material being processed. It is very important to be able to reduce the temperature rise in the treated meat to a fraction of that previously experienced in meat cutting or grinding operations.

Other objects relate to the provision of a novel and simple apparatus for effectuating the above purposes as will more fully appear from the following disclosure of the invention.

Figures 1, 2, 3, 4:
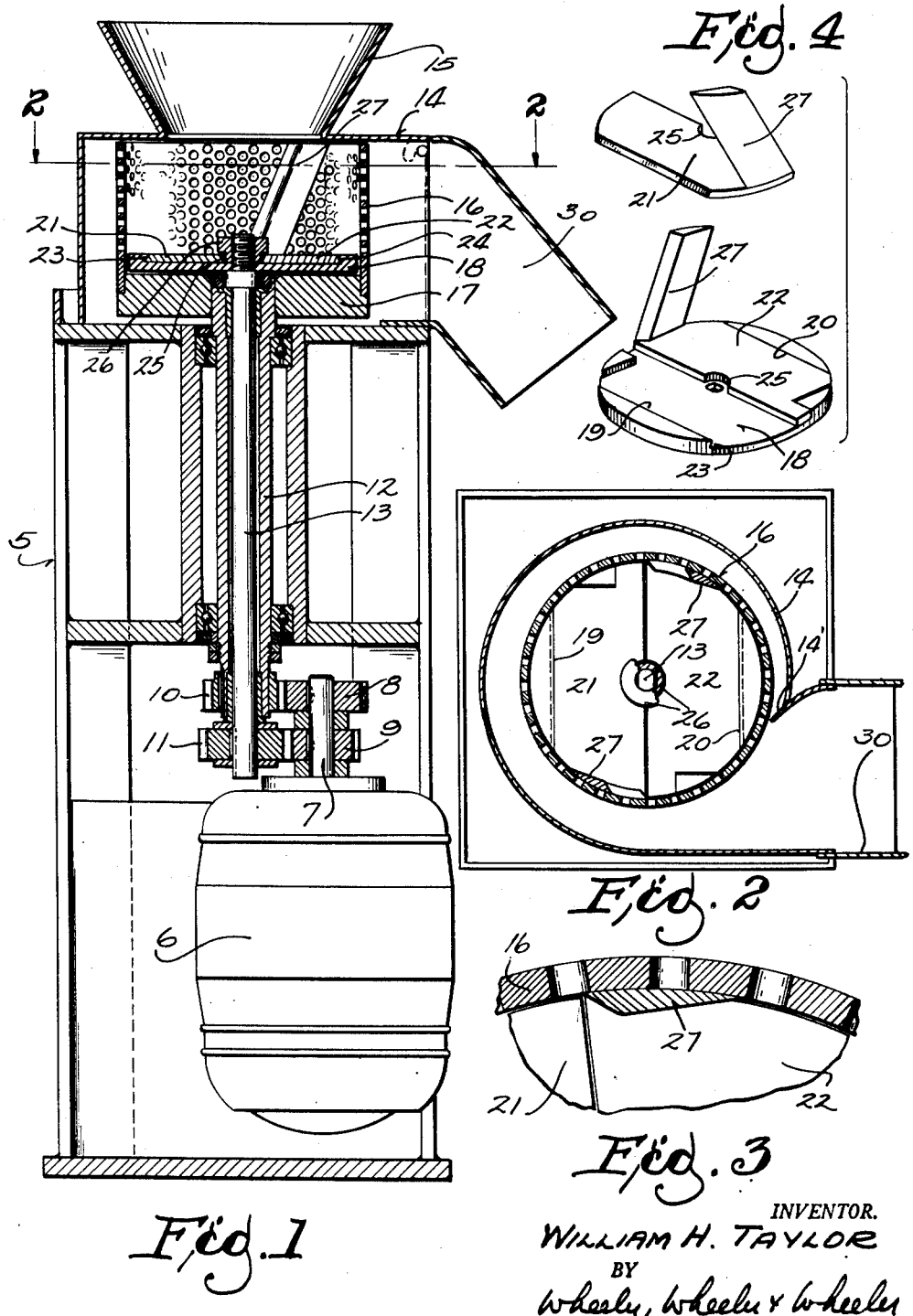
Fig. 1 is a vertical axial section through the device embodying the invention.
Fig. 2 is a view taken in horizontal section on the line 2—2 of Fig. 1.
Fig. 3 is a greatly enlarged fragmentary detail view in plan.
Fig. 4 is a view in perspective showing in relatively separated positions some of the component parts of the knife-carrying rotor.

In its preferred form, the apparatus used comprises a cabinet 5 within the base of which there is a motor 6 having an armature shaft 7 provided with driving pinions 8 and 9. These mesh respectively with gears 10 and 11 on concentric shafts 12 and 13 which are provided with suitable bearings in the cabinet.

Mounted at the top of the cabinet is the chopping chamber 14 centrally provided with a feed hopper at 15. Beneath the feed hopper, with its upper end open to receive material dropped therethrough, is a foraminous cylinder at 16 carried on disk 17 which is connected with the outer shaft 12.

Within the cylinder 16 is a disk or plate 18 mounted on the upper end of shaft 13 and provided with parallel ways 19 and 20. Cross slides 21, 22, identical with each other, have limited reciprocation in their respective ways and the side margin of each such slide delineates the way provided for the other slide. The opposite margins of the respective slides are beveled to fit beneath the undercut edges of the ways at 23, 24 (Fig. 1). Since the respective slides have very limited movement, it is only necessary to notch them slightly at 25 to accommodate the nut 26 which holds disk 18 to the upper end of shaft 13.

The respective slides carry shear knives 27 which are preferably, though not necessarily, given a rake or inclination from the vertical. The external surfaces of these knives are cylindrically finished or, in any event, so made that the cutting edges of the respective knives will move with shearing action across the apertures in the wall of the foraminous cylinder 16.

The purpose of the slides is to enable the knives to move in response to centrifugal force into intimate bearing contact with the walls of the foraminous cylinder, where the slow relative movement between the knives and the cylinder causes the knives to wipe the interior of the cylinder and to move with true shearing action across those portions of the meat which are extruded through the apertures. The slide and blade assemblies may be adjusted as to their relative masses at opposite sides of the axis of rotation to effectuate any desired bias of the blades toward the cylinders. In practice, even a relatively slight differential will develop sufficient centrifugal force to hold the blades so firmly to the cylinders as to make it impossible for any of the material to push the blades away from the cylinders. Yet there is practically no wear, since the relative movement between the knives and the cylinder is quite slow.

When the nut 26 is removed, it is readily possible to lift the respective slides 19, 20 along their edges which are nearest the diameter of disk 18, thereby freeing their remote edges from the overhanging of the ways. Thereupon the slides, together with the knives, may readily be removed for cleaning or for the sharpening of the knives. In connection with sharpening, however, it should be mentioned that the knives tend to keep themselves sharp and have been found to have remarkably little wear in use. To restore the slides to their respective ways, their remote margins should first be inserted beneath the overhanging edges of the respective ways, whereupon the center margins of the respective slides will drop or be dropped into place and are anchored by the shoulder of nut 26 as shown in Fig. 1.

In practice, it is found appropriate to operate the cylinder at approximately 2200 R. P. M. (the cylinder diameter being 6¾ inches). The knives then are desirably operated at 1800 R. P. M., these speeds being achieved by the selection of proper gear ratios to drive the shafts 12 and 13. Obviously, relative movement of the knives with respect to the cylinder would be effective in either relative direction of rotation. It is, therefore, merely a matter of choice that in the device illustrated the knives rotate slightly slower rather than slightly faster than the cylinder, both operating in the same direction. Since the cylinder, rather than the knives, is rotating more rapidly for the purpose of the present disclosure, the back edges of the knife blades will be the sharp edges. In other words, both the cylinder and the knife blades are rotating counterclockwise as viewed in Fig. 2 and Fig. 3, but the effect is the same as if both were rotating clockwise with the knife blades operating at slightly higher speed than the cylinder.

The material introduced through the hopper to the interior of the cylinder is thrown outwardly by centrifugal force, the force being sufficient to cause portions of the material to extrude into the cylinder apertures. In the course of relative movement between the cylinder and the knives, the extruded portions of the material are sheared off and fly outwardly through the apertures. It will be noted from Fig. 2 that the wall of chamber 14 is desirably volute in leading to the discharge pipe 30. At 14', however, it is desirable that the wall deviate sharply from the path of the cylinder, the space at one side of the wall portion 14' leading to the discharge and at the other opening into the volute chamber. The wall portion 14' keeps fatty material from packing in the chamber. With ordinary material this feature is unnecessary.

Because the knife blades are fully supported by the inner periphery of the cylinder, and have a relatively slow movement with respect to the cylinder, they do not impact bones which enter the apparatus. The bones simply whirl about in the apparatus and all available portions of meat clinging thereon are finally extruded through the holes and sheared off without in any way damaging the knives.

Since the only material extruded is the material whirling with the cylinder, it is perfectly safe for an operator to reach in with his bare hands. The only damage he could possibly sustain would be skinned knuckles.

A 2 hp. motor driving a device embodying the present invention will cut up a minimum of 1000 lbs. of meat per hour whereas a grinder of conventional design driven with a 40 hp. motor will average only 5000 lbs. per hour. Moreover, the device of the present invention retains most of the meat juices which are expressed from the meat in the conventional screwthread grinder.

A very important feature of the present invention consists in the fact that it only raises the temperature of the meat approximately three to six degrees (respectively using $\frac{1}{16}$ and $\frac{3}{16}$ apertures) as compared with an increase of eight to twelve degrees in the use of an ordinary grinder. The expensive refrigerating job which the packers have to do is always the last few degrees of temperature reduction. Thus, to reduce the meat from forty-five degrees to thirty-five degrees requires the greater proportion of all of the horse power used in refrigeration. If, in the course of grinding, the meat is raised back to forty-five degrees, all of this energy is lost. There is, therefore, a tremendous amount of saving in energy of refrigeration, in addition to the remarkable reduction in the horse power required for the meat cutting operation.

While the method here involved has been indicated as in incident to the disclosure of the apparatus and its operation, it may be preferably summarized as follows:

The meat or other material to be cut up into small pieces is revolved at high speed in a foraminous container having a smooth wall with apertures of a size determinative of the size of the pieces. Also revolving at high speed, but at a speed slightly different from the container, are the shearing knives which cut the extruded meat from the mass of meat remaining unextruded in the revolving container. As fast as extruded portions of the meat are severed, other portions of the meat will be extruded and likewise severed until all of the meat which is capable of being cut is discharged through the apertures of a foraminous container.

The centrifugal force developed in the rotation of the container is so greatly in excess of gravity that it makes not the slightest difference whether the axis of rotation is upright or otherwise. In either case, the velocity imparted to the severed extruded particles may also be used to facilitate the discharge of such particles from the apparatus.

The shearing of the particles is effected by means of a very sharp blade, the edge of which is protected, however, by reason of the fact that it operates in bearing proximity to the foraminous container wall, being held thereto by the same centrifugal force which extrudes the meat. Due not only to the wiping of the cutting edge upon the container wall, but due also to the rake or inclination of such edge, the cut is a true shearing cut with a minimum of compression, whereby most of the juice is left in the meat.

The method herein disclosed, therefore, consists in rotating both a knife and a foraminous cylinder at sufficiently high speed to extrude meat or the like through the openings of the cylinder, while maintaining a sufficient differential speed to shear off the extruded portions of the meat from those remaining in the cylinder and to accomplish their severance with a minimum of cell disruption.

What is claimed is:

1. The combination with a foraminous rotatable container having an apertured wall of circular cross section, of a complementary knife within the container and comprising a blade extending generally axially of the container and in shearing relation to the wall of the container and mounted for rotation co-axially with the container, means for rotating the container at a sufficiently high speed to extrude material through the openings thereof, and means for rotating the knife at a speed different from that of the container, the speed of the container relative to the knife being such as to shear off extruded portions of such material, both the knife and the material being radially yieldable to be impelled by the centrifugal force of rotation of the container and knife against the apertured wall of the container.

2. The combination with a basket comprising a foraminous wall of circular cross section and a mounting upon which said basket is rotatable, of a knife mounting within said basket and rotatable coaxially with the mounting for said basket, a knife on the knife mounting having a cutting edge extending in a direction having a major component axially of the basket, said knife being in centrifugal bearing engagement with the inner surface of said wall for the shearing of material extruded through the openings therein, and means for the rotation of said mountings at differential speeds, the speed of rotation of the basket mounting being sufficiently high to effect extrusion through the foraminous wall of material to be severed by said knife in the course of relative movement of the knife respecting the basket.

3. The combination set forth in claim 2 in which the knife mounting is provided with a support comprising guide means upon which the knife mounting is movable respecting the axis of rotation, said knife mounting having its center of weight offset outwardly of said axis toward said knife, whereby the knife is mounted to be held centrifugally to the basket wall.

4. The combination set forth in claim 2 in which the knife mounting comprises a slide and a slide mounting in which the slide is radially movable respecting the axis of rotation and having its center of weight offset outwardly of said axis toward said knife, whereby the knife is mounted to be held centrifugally to the basket wall, said knife having a sharp edge with a rake for elongating the shearing cut of said edge across successive openings in said wall.

5. Apparatus of the character described comprising a pair of coaxial shafts, means for the driving thereof at differential speeds, a cylindrical basket connected with one of said shafts, a knife mounting within the basket connected with the other, a pair of slides on the knife mounting for which said mounting is provided with transverse ways in which the slides are freely movable, and knives mounted on the respective slides and in bearing engagement with said wall.

6. The combination set forth in claim 5 in further combination with a volute chamber within which said basket is rotatable, said chamber having a tangential delivery spout and an inlet opening into an end of said basket.

7. In a meat chopping device, the combination with a foraminous rotatable container having an apertured side wall of circular cross section and at least one open end, of a rotatable mounting co-axial with said container and upon which said container is carried for rotation upon its axis, a knife carrier within the container and remote from the open end thereof, a separate rotatable mounting for said knife carrier co-axial with the rotatable mounting of the container, means for driving the respective rotatable mountings at differential speeds, the speed of the container being sufficient to extrude meat centrifugally into the apertures of said wall, and a knife mounted on said carrier immediately adjacent said wall and remote from said axis, said knife having a sharp edge co-acting with said wall to shear material extruded centrifugally into said apertures, a central portion of said container within said knife being open and unobstructed for the receipt of meat to be cut and for the removal of material incapable of extrusion into said apertures.

8. In a meat chopping device, the combination with a foraminous rotatable container having an apertured side wall of circular cross section, and a bottom with which said side wall is connected, the end of the container opposite the bottom being open, of a rotatably mounted tubular shaft connected with said bottom, means for driving said shaft at a rate sufficient for the centrifugal extrusion of meat from the interior of said container into the apertures of said wall, a knife carrier within the container at a point remote from the open end thereof, a shaft connected with the knife carrier and extending through said tubular shaft, means for driving the shaft last mentioned at a differential rate respecting the tubular shaft, whereby the knife carrier is operated at a speed differing from that of the container, and a set of knife blades mounted on the carrier and disposed within the container in immediate proximity to said wall, the entire central portion of the container being open and unobstructed, and the said knives having sharp edges in substantial bearing contact with said wall for cooperation therewith in shearing from meat within the container any portions of such meat extruded into the said apertures, the said edges being disposed to project in the direction of relative movement of the knives respecting the container.

9. The device of claim 8 in which said carrier comprises guide means disposed transversely thereof, and slides reciprocable upon said guide means and upon which the respective knives are mounted, the said slides having their center of mass disposed between the axis of the shaft last mentioned and the respective knives carried by the respective slides, whereby the respective knives are centrifugally urged into intimate contact with the inner surface of said wall.

10. A method cutting small portions from a mass of centrifugally yieldable matter, comprising the steps of supporting the matter at points less widely spaced than the dimensions of the mass, rotating the mass and its supports at substantially the same speed, thereby centrifugally urging the mass against its supports to cause small portions of the mass to yield outwardly in tension between said supports, rotating a shearing member at a different rate from said supports and mass but coaxially with said supports and mass, and centrifugally pressing said shearing member against said supports interiorly thereof, thereby advancing the shearing member across said supports to shear said tensioned particles from the portions of the mass contacting said supports.

WILLIAM H. TAYLOR.

References Cited in the file of this patent

UNITED STATES PATENTS

| Number | Name | Date |
| --- | --- | --- |
| 271,398 | Baker | Jan. 30, 1883 |
| 738,616 | Kollman | Sept. 8, 1903 |
| 1,608,460 | Blankinship | Nov. 23, 1926 |
| 1,782,296 | Goldstein | Nov. 18, 1930 |
| 2,163,878 | Hornung | June 27, 1939 |
| 2,278,662 | Lodge | Apr. 7, 1942 |
| 2,297,880 | Fredrickson | Oct. 6, 1942 |
| 2,302,138 | Nicholson | Nov. 17, 1942 |
| 2,304,929 | Keith | Dec. 15, 1942 |
| 2,416,043 | Bucher-Guyer | Feb. 18, 1947 |
| 2,459,230 | Litten | Jan. 18, 1949 |
| 2,485,226 | Weeden | Oct. 18, 1949 |
| 2,507,614 | Sarland | May 16, 1950 |

FOREIGN PATENTS

| Number | Country | Date |
| --- | --- | --- |
| 25,710 | France | Apr. 13, 1860 |
| 21,748 | Germany | Mar. 27, 1883 |